Feb. 15, 1966 G. N. MILES ET AL 3,235,178
AIR ASPIRATING APPARATUS FOR HEATING OR COOLING BUILDINGS
Original Filed April 19, 1961 5 Sheets-Sheet 1

INVENTORS
GEORGE N. MILES
FRANK W. BAILEY
BY CALVIN D. MAC CRACKEN

Curtis, Morris & Safford
ATTORNEYS

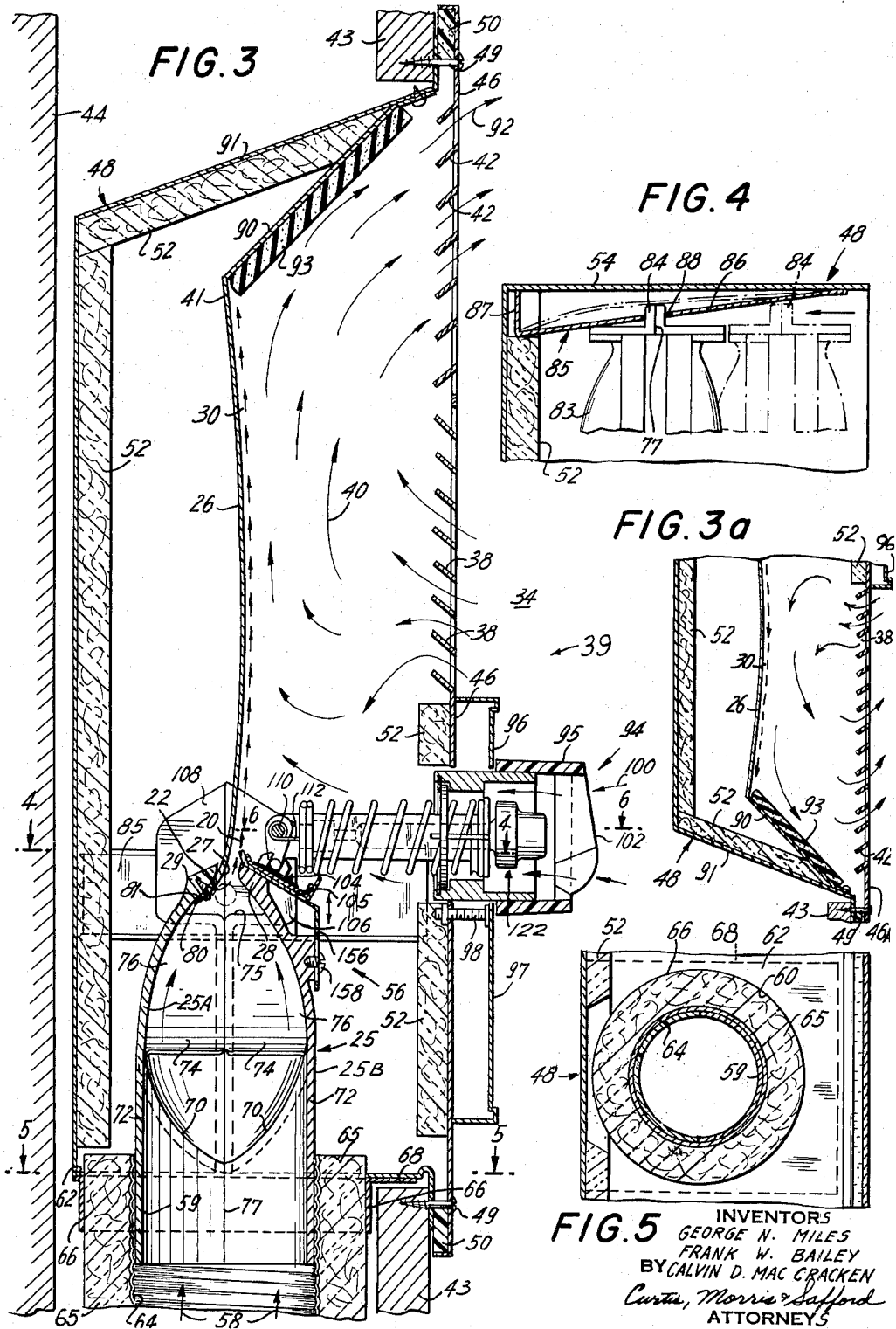

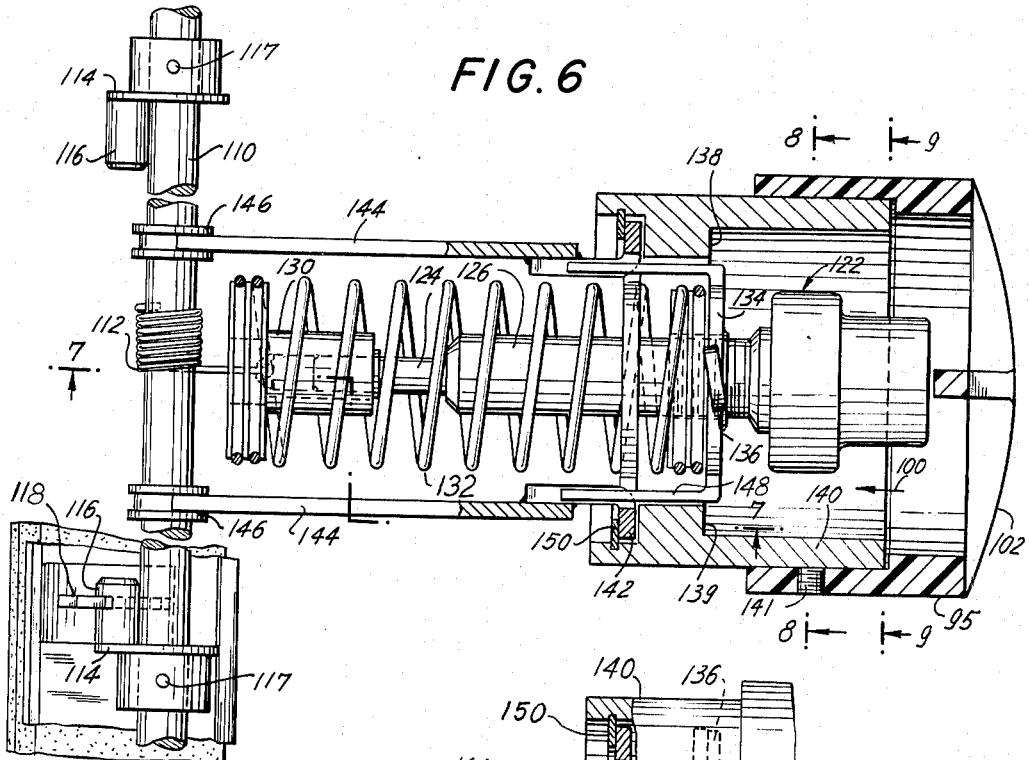
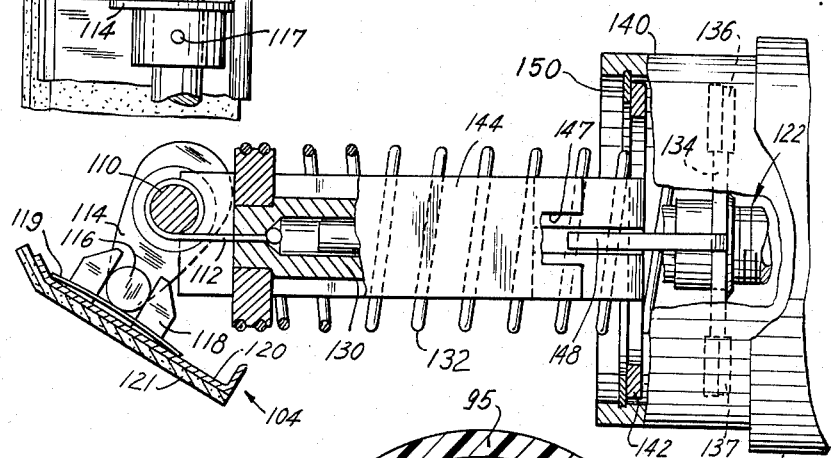
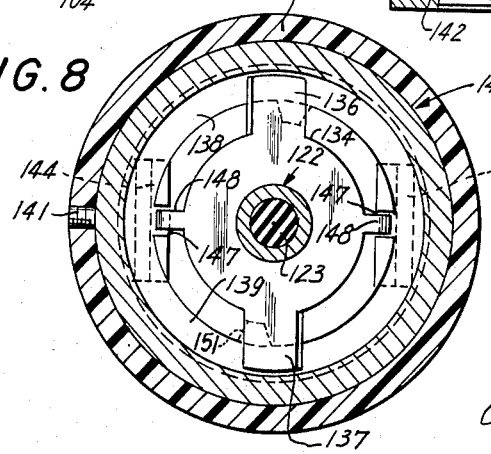

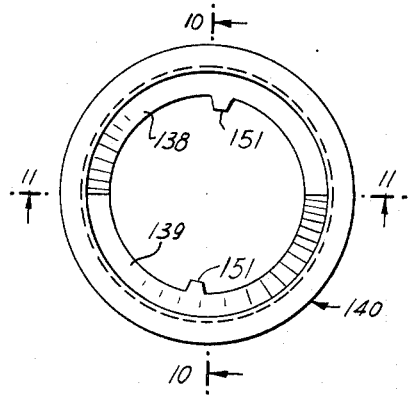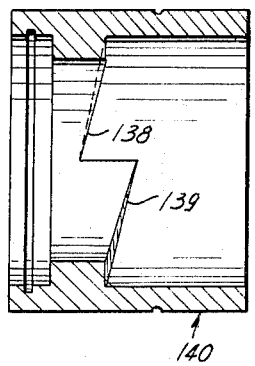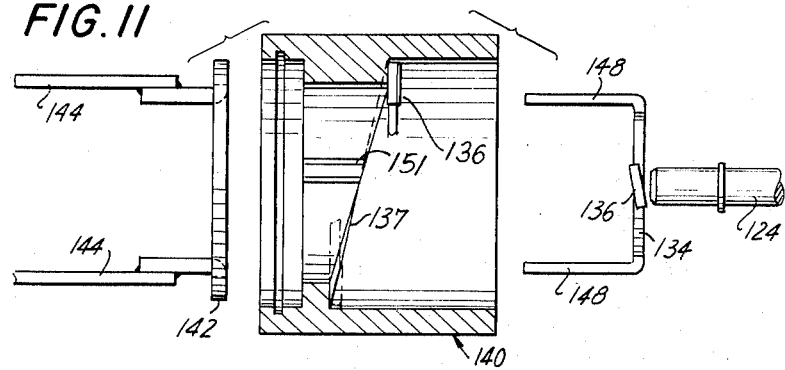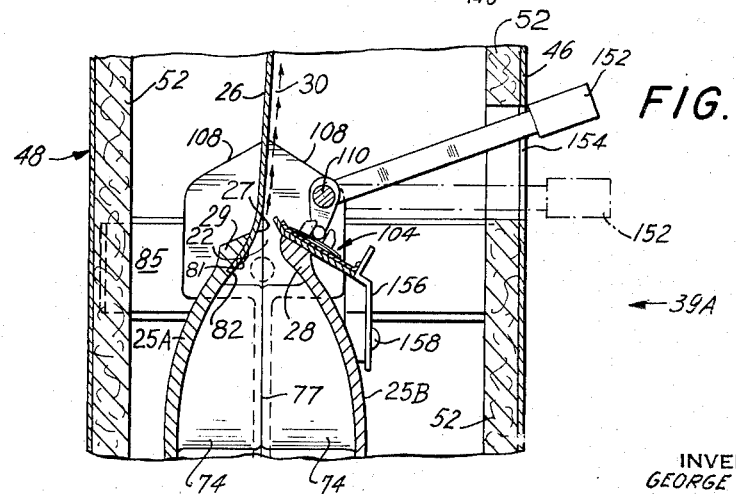

INVENTORS
GEORGE N. MILES
FRANK W. BAILEY
BY CALVIN D. MAC CRACKEN

Curtis, Morris & Safford

ATTORNEYS

United States Patent Office 3,235,178
Patented Feb. 15, 1966

3,235,178
AIR ASPIRATING APPARATUS FOR HEATING OR COOLING BUILDINGS
George N. Miles, Tenafly, Frank W. Bailey, Wayne, and Calvin D. MacCracken, Tenafly, N.J., assignors to Calmac Manufacturing Corporation a corporation of New York
Continuation of application Ser. No. 116,902, Apr. 19, 1961. This application July 7, 1964, Ser. No. 382,688
10 Claims. (Cl. 236—13)

This is a continuation of application Serial No. 116,902, filed April 19, 1961, now abandoned.

This invention relates to air aspirating methods and apparatus for heating or cooling buildings. More particularly, the present invention relates to air aspirating methods and apparatus wherein very hot air or very cold air, which is supplied at high velocity from a suitable heating or cooling apparatus, is used to induce the flow of a much greater amount of air drawn from the building, and then the high velocity air is mixed with the flowing room air to provide a large quantity of moving air at the desired comfortable moderate temperature which is fed to the living space within the building to maintain a comfortable living temperature therein.

Air aspirating registers described as illustrative examples of this invention are well suited for thermostatic control for automatically regulating their own output in accordance with the temperature of the room air and provide many important advantages in operation.

The air aspirating methods and apparatus of the present invention are particularly intended to be used in a heating or cooling system in which very hot air or very cold air is supplied at a high velocity, that is, at an air flow velocity of between 1,000 and 3,200 feet per minute. For example, in a heating system utilizing the present invention, the high velocity air is supplied to the air aspirating register at a normal operating temperature above 200° F. and usually less than 350° F. This hot air induces the flow of a much greater amount of room air and then mixes with this moving room air to produce a large volume flow of air at the desired moderate warm temperature. As an example, it is noted that in a cooling system utilizing the present invention, the high velocity air is supplied at a normal operating temperature below 55° F. and usually above 35° F. and produces a large volume flow of air at the desired moderate cool temperature.

In this high velocity type of heating or cooling wherein a relatively small mass of very hot or very cold supply air is mixed with a larger mass of room air to produce the desired moderate temperature of air introduced into the living space, the ratio of induced room air to supply air, as measured on a weight-to-weight basis, should be more than 1 to 1. This ratio is called the aspirating ratio. When the aspirating ratio drops below this value of 1 to 1, then the actual temperature of the air being introduced into the living space is usually too hot or too chilly for comfort. Also, when the aspirating ratio drops below a ratio of 1 to 1, undue variations and graduations in temperature occur throughout the living space. In the case of a cooling system, an aspirating ratio below 1 to 1 often causes the grille face covering the register to become cooler than the dew point so that condensation appears on the grille face with resultant dripping and staining. With the higher aspirating ratios provided by the illustrative embodiments of the invention, the larger induced air flow maintains the temperature of the grille face above the dew point.

Among the many advantages of the illustrative examples of the air aspirating methods and apparatus of the present invention described herein are those resulting from the fact that an aspirating ratio of at least 1 to 1 is provided. Moreover, an aspirating ratio above 1 to 1 is maintained under widely varying operating conditions, as will be explained in detail further below. As a result, a very comfortable temperature is provided in the room adjacent to the point at which the air is introduced and undue variations or graduations in temperature in the room are avoided under the widely varying operating conditions encountered in actual usage throughout the year.

A further advantage of the aspirating registers described herein as illustrative examples of the invention is the low decibel mixing of the high velocity supply air with ambient air. These illustrative registers are adapted for mass production at relatively low cost while providing efficient operation in practical usage.

In accordance with the air aspirating methods and apparatus of the present invention, the high velocity supply air is ejected as a thin layer passing through a long and relatively narrow orifice. An air flow guide surface of special configuration extends from one side of this orifice adjacent to the layer of high velocity air being ejected therefrom. This guide surface extends a substantial distance away from the orifice and provides a contoured face which effectively curves backwardly away from its initial direction near the orifice. Advantageously, this construction and arrangement of the special guide surface holds the layer of high velocity air in clinging relationship with the guide surface and causes it to form a rapidly moving continuous film of air traveling along adjacent to the guide surface. The large mass of room air in which flow is to be induced is exposed to this rapidly moving film of supply air. As a result of the provision of this backwardly curved guide surface, the high velocity layer of air is enabled to maintain its own identity with no significant mixing with the room air and is enabled to maintain a relatively high velocity throughout its extent as it travels along adjacent to the backwardly curved guide surface. The room air becomes propelled along in the direction of movement of the high velocity air by the velocity drag occurring at the interface between the high velocity film of supply air and the slower moving room air.

By virtue of the fact that the high velocity film maintains its identity and maintains a high relative velocity throughout the extent of the curving guide surface, the total area of the propelling interface between the high velocity film and the room air is large. Moreover, this propelling action is cumulative over the total extent of the high velocity film. Consequently, a highly effective and advantageous cumulative total propelling action is provided for inducing the flow of a much greater mass of room air, yielding an aspirating ratio of at least 1 to 1 and usually considerably more under normal operating conditions.

Among the many advantages provided by the illustrative embodiments of the present invention described herein are those resulting from the fact that the amount of high velocity supply air ejected through the orifice is modulated directly at the orifice in accordance with required amount of heating or cooling within the rooms. This modulation or control of the high velocity supply air is obtained by changing the effective size of the orifice itself. By virtue of this modulation of the high velocity supply directly at the orifice, the aspirating ratio is maintained and in most cases is actually increased as the amount of high velocity supply air is reduced. This important advantage is in marked contrast to the prior arrangements wherein a throttle valve or damper is used to restrict a duct leading to an orifice. In such prior arrangements, a partial closing of the damper valve causes a reduction in pressure in the duct between the damper and the orifice. As a result, the velocity of the air through the orifice is reduced, and the aspirating ratio drops to a lower value causing unduly hot or cold output.

In the illustrative examples of the present invention, a partial closure of the orifice actually produces a pressure rise in the pipe leading to the orifice. This rise in pressure occurs because the pipe remains unobstructed, while the total flow through the pipe is reduced, thus producing a smaller pressure drop in the length of pipe between the source of the supply air and the orifice. Consequently, a reduction in the effective size of the orifice produces an increase in pressure immediately inside of the orifice with an advantageous increase in the high velocity of the air being ejected. This actual increase in velocity as the flow is restricted serves to maintain an aspirating ratio of more than 1 to 1 and usually produces an increase in the aspirating ratio. Thus, the desired moderate temperature of the air being fed to the room is advantageously maintained over a wide range of operating conditions.

A further advantage of the illustrative embodiments of the present invention described herein results from the fact that only a relatively small movement of a control shutter serves to change the orifice from its fully open to its fully closed position. For example, in these illustrative examples of the invention, the full travel of the control shutter is equal to 3/16 of an inch or less. Thus, the actuation of the control shutter is well suited for automatic operation by a thermostatic assembly as described. Further, this construction provides complete shut-off, which is extremely desirable for quiet operation in a high velocity system.

An additional advantage of the thermostatically controlled air aspirating register of the present invention is its highly effective action in sensing the actual temperature of the air in the room in which the register is located. This register is compact, and the thermostatic control assembly is included as an operating part of the register. Nevertheless, the thermostatic control assembly is isolated from the temperature of the high velocity supply air and sensitvely responds to the temperature of the air in the room. When it is remembered that the supply air is often at a temperature near 350° F., and yet the thermostatic control assembly is isolated from this high temperature and sensitively and accurately responds to slight changes in the temperature of the room air, it will be appreciated how truly effective is its operation. The thermostatic control assembly has an air passage directly therethrough for the room air. The efficient aspirating operation of the apparatus throughout its wide range of operation assures that a large flow of the room air is always induced through the thermostat itself.

By virtue of the fact that the flow of supply air is modulated at the orifice, the aspirating ratio is maintained, and in some cases is increased, even when the flow of the supply air is greatly reduced by the shutter. Thus, a sufficient amount of room air is always induced to flow through the thermostat to provide accurate response to the actual temperature of the room air. As a result, spurious responses to temperature of the nozzle either caused by transmission or convection from the nozzle are desirably avoided.

This advantageous cooperative interaction of the air aspirator and its thermostatic control assembly assures the desired temperature in the room as set by the control knob regardless of whether the apparatus is providing maximum or minimum output.

Moreover, the air aspirating register shown as an illustrative embodiment of this invention is enclosed in a casing only twelve inches wide, twelve inches high and four inches deep so that it conveniently fits between the studs of a partition or wall or in any similar clearance space in the wall of a room and requires an opening only four inches deep. The construction is strong and adapted for reliable operation and avoids complex fabrication so that it is well adapted for mass production and for ease of installation.

In this specification and in the accompanying drawings are described and shown air aspirating methods and apparatus for heating or cooling buildings as embodiments of the present invention and various modifications thereof are indicated, but it is to be understood that these examples are not intended to be exhaustive nor limiting of the invention, but on the contrary, are given for purposes of illustration in order that others skilled in the art may fully understand the invention and the manner of applying the methods and apparatus in heating or cooling systems so that they may modify and adapt various forms, each as may be best suited to the conditions of a particular use.

Although the air aspirating methods and apparatus embodying the present invention are described with particular emphasis upon heating systems, it is intended to be understood by those skilled in the art that this is for convenience of explanation of the many operating advantages under demanding and severe conditions of usage, and operating advantages of a similar nature are provided by utilizing the air aspirating methods and apparatus of this invention in a cooling system or air conditioning system for a building. In this specification the phrase "hot air supply" or similar term as applied when considering a heating system is intended to include the corresponding phrase "cold air supply" or similar term as applied when considering a cooling or air conditioning system; likewise the term "warmer" is intended to include the corresponding term "cooler."

The various objects, aspects and advantages of the present invention will be more fully understood from a consideration of the following description in conjunction with the accompanying drawings, in which:

FIGURE 3 is a vertical sectional view of the air aspirator of FIGURE 1 taken along the centerline 3—3 and being drawn to a scale which illustrates the apparatus at four-fifths of its actual size;

FIGURE 3A illustrates a modified grille face;

FIGURE 4 is a partial sectional view taken along the line 4—4 of FIGURE 3 showing the aspirator mounting arrangement at one side of the casing;

FIGURE 5 is a partial sectional view taken along the line 5—5 of FIGURE 3 illustrating the construction at the lower end of the casing, being drawn on a reduced scale from FIGURE 3;

FIGURE 6 is a partial sectional view taken generally along the line 6—6 of FIGURE 3 and shown on a scale of twice actual size to disclose features of construction and operation of the thermostatic control assembly;

FIGURE 7 is a partial sectional view of the thermostatic control assembly taken along the line 7—7 of FIGURE 6;

FIGURE 8 is a cross sectional view of the thermostatic control assembly on the line 8—8 of FIGURE 6;

FIGURE 9 is an end view of the cam element of the control knob, as seen looking along the line 9—9 of of FIGURE 6, and shown on a scale of one and three-fifths actual size;

FIGURE 10 is an axial sectional view of the cam element on the line 10—10 of FIGURE 9;

FIGURE 11 is an axial sectional exploded view of parts of the thermostatic control assembly including the cam element as seen along the line 11—11 of FIGURE 9;

FIGURE 12 is a partial vertical sectional view of another embodiment of the present invention adapted to be controlled manually;

Figure 14:
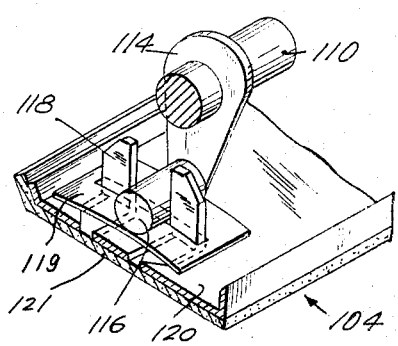
FIGURE 14 shows further details of a shutter assembly for controlling the air flow.

As illustrated in FIGURES 3 and 14, in the air aspirating methods and apparatus of the present invention, the high velocity supply air is ejected as a thin layer 20 passing through a long and relatively narrow orifice 22. The high velocity air forming the layer 20 is supplied from a suitable heating or cooling apparatus, as the case may be, for heating or cooling a building. The layer 20 is ejected in an initial direction as indicated by the arrow 24 adjacent to an extensive air flow guide surface 26 of special configuration, as will be explained. This guide surface 26 extends a substantial distance away from the orifice 22 and provides a contoured face which effectively curves backwardly away from its initial direction near the orifice. In the preferred embodiment of the invention, the initial area 27 of the guide surface 26, which is adjacent to the emerging high velocity layer 20, serves to define one side of the long narrow orifice 22. The other side of the orifice 22 is defined by a lip 28 spaced substantially uniformly away from the area 27 along the length of the orifice.

This initial area 27 of the guide surface at the narrowest throat of the orifice 22 is directed substantially tangential to the direction 24 of the emerging high velocity layer 24, and begins curving backwardly just outside of the orifice 22.

Thus, it will be appreciated that this initial area 27 of the guide surface provides a convex face or bulging contour which diverges backwardly farther away from the initial direction 24 of the high velocity layer as the guide surface continues outwardly away from the orifice 22. As the high velocity layer 20 passes by this bulging contour near the orifice, a reduced pressure is created adjacent to the face of the guide surface 26, and the layer 20 is caused to cling to this guide surface and forms a rapidly moving continuous film of air 30 travelling along adjacent to the guide surface 26. This guide surface 26 effectively continues to curve backwardly as the film 30 travels further away from the orifice.

Thus, the film 30 is continuously travelling over a surface which is effectively convex as measured in the direction of flow 32 of the film 30, and consequently, the reduced pressure adjacent to the guide surface extends substantially throughout its extent beneath the film 30. The construction and arrangement of the guide surface 26 holds the film 30 in clinging relationship therewith.

The large mass of room air 34 in which flow is to be induced is exposed to this high velocity film 30 over the extensive area of the film 30. Advantageously, the film 30 maintains its own identity with no significant mixing with the room air, and thus it is enabled to maintain a relatively high velocity as it travels along adjacent to the guide surface 26. The room air becomes propelled along in the direction of movement of the film 30 by the frictional viscous velocity drag occurring at the interface 36 between this high velocity film of supply air and the slower moving room air.

It is an advantage of the methods and apparatus of this invention that an aspirating ratio of at least 1 to 1 is provided because the total area of the propelling interface 36 is large. Moreover, the film 30 is travelling at a high velocity so as to produce a substantial component of velocity drag at every elemental area of the interface, and this velocity drag is cumulative in effect, thus producing a highly effective propelling action.

The room air 34 enters in an inlet zone 38 in the vicinity of the orifice 22 and is propelled along beside the interface 36 as indicated by numerous flow arrows 40. As the film 30 nears the far limit 41 of the convex guide surface 26, it strikes an inclined baffle 90 and is deflected toward an outlet zone 42. The high velocity supply air from the film 30 becomes thoroughly mixed with the moving room air 40 after the film 30 has reached the limit 41 of the guide surface as they move together toward the outlet zone 42. As a result, a uniform moderate temperature is provided at all points near the outlet zone 42.

In most installations it is found to be preferable to have a greater curvature or bulge, i.e., a more rapid change in direction, in the initial area 27 of the guide surface 26, as compared with the curvature of the guide surface at points more remotion from the orifice 22. This initial bulge at 27 is immediately adjacent to the discharge path 24 from the orifice 22 and stabilizes the fast moving layer of air 20 assuring that this layer will begin clinging to the guide surface immediately after leaving the orifice so as to form the stable fast moving film 30 travelling along the guide surface. Thereafter, a reduced curvature is usually found to be sufficient to hold the film 30 close to the guide surface 26 and maintain this film continuously adjacent to the guide surface. In other words, the initial bulging contour at 27 creates a low pressure region adjacent to the guide surface 26 and assures stability in the film 30. In certain installations where the velocity of the ejected layer is low, then this initial curvature can be reduced so that the effective curvature of the guide surface is more uniform throughout, but in most installations it is found to be preferable to have the initial region 27 of increased curvature as compared with the average curvature throughout the area of the guide surface 26. Also, where particular flow patterns are required in the film, other areas remote from the orifice and having a greater curvature than the average curvature of the guide surface can be incorporated. However, using a guide surface having an initial area with greater curvature than the curvature of the remaining area has been found to be the most satisfactory under widely varying conditions of operation and thus is preferred as shown.

Figure 1:
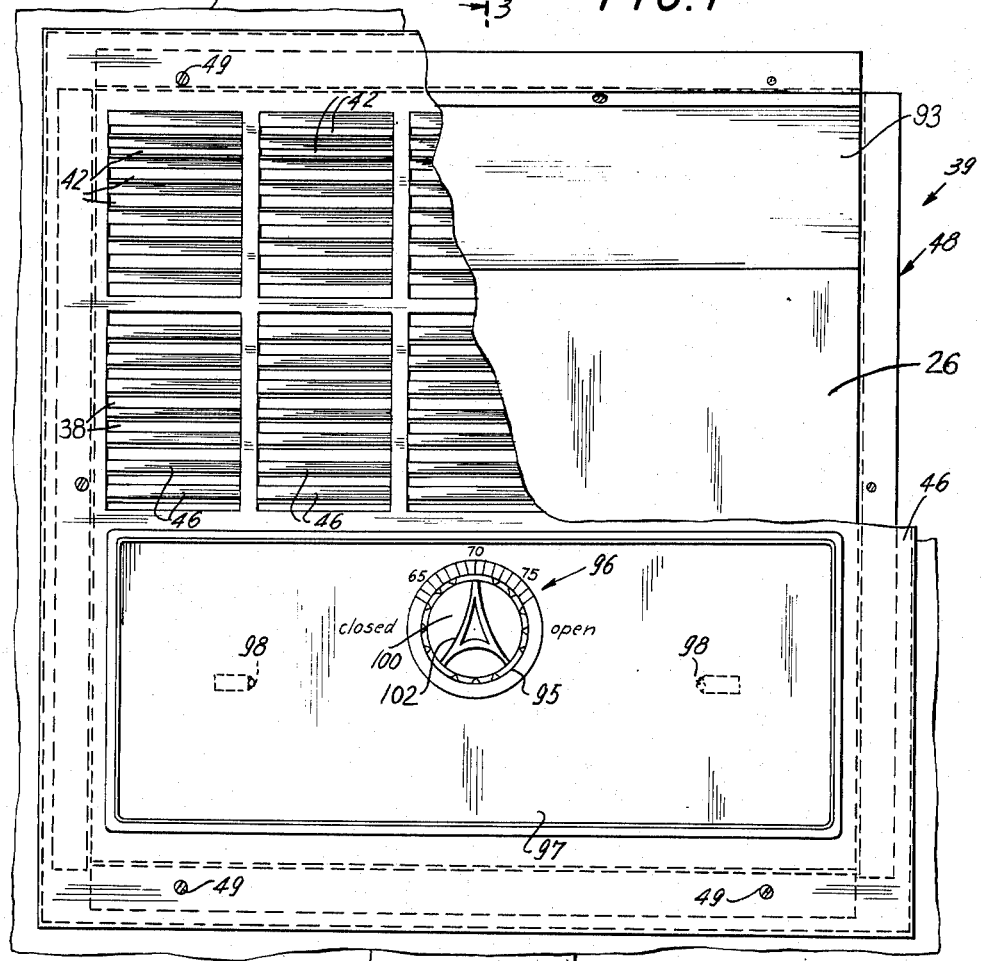
FIGURE 1 is a front elevational view of a thermostatically controlled air aspirating register embodying the present invention, with a portion of the face plate shown broken away to reveal certain features of construction. This figure is drawn to a scale of one-half showing this embodiment of the invention as one-half its actual size.
Figure 2:
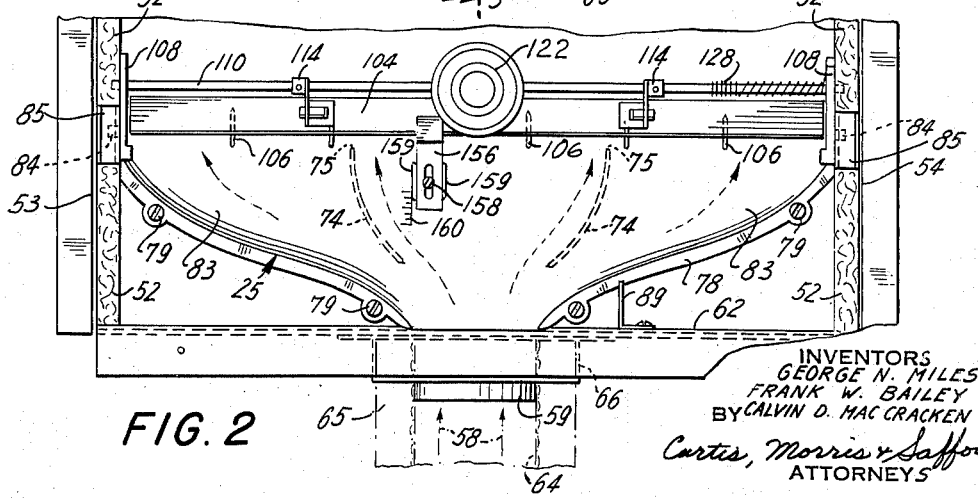
FIGURE 2 is a front elevational view of the lower portion of the air aspirating apparatus of FIGURE 1 drawn on the same scale as FIGURE 1, with the face plate removed to disclose the nozzle construction.
Figure 13:
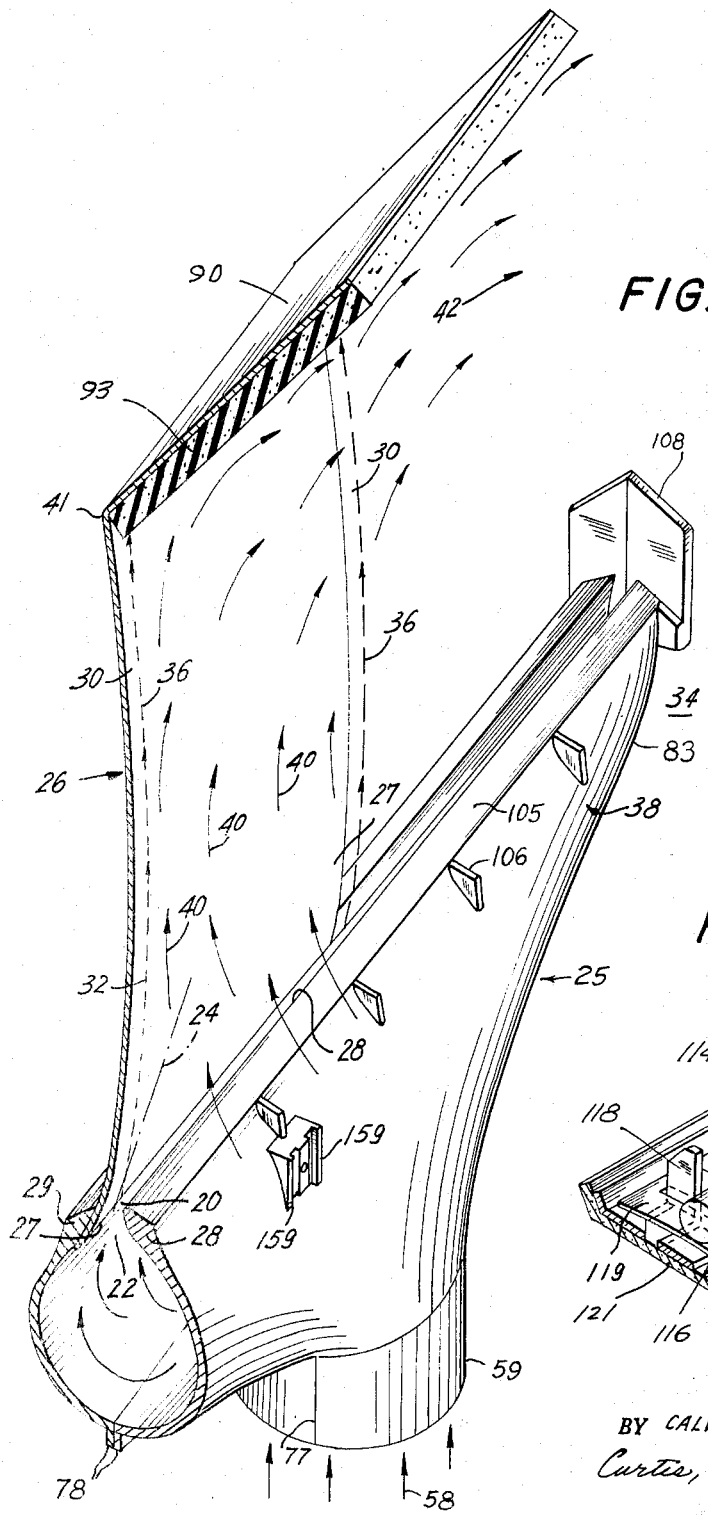
FIGURE 13 is a schematic diagram for illustrating certain of the principles and advantages of the air aspirating apparatus of the present invention.

The thermostatically controlled air aspirating register 41 as shown in FIGURES 1, 2 and 3 is a preferred embodiment of the present invention and is adapted to be installed in the space between adjacent studs in a wall or partition of a room to be heated or in any similar clearance space or opening in a wall or partition. In these figures the outside portion of a room wall or partition is indicated at 43, and the back portion is indicated at 44. The face plate or grille face 46 of the air aspirating register is provided with inlet and outlet openings, which may be of any shape, such as inlet louvre openings 38 and outlet louvre openings 42. The casing or box 48 of the air aspirating register is located within the wall, and the face plate 46 is secured to the casing 48 by screws 49 which also serve to secure the casing to the wall 43, as best shown in FIGURE 3. Around its perimeter the face plate 46 seats against a resilient gasket 50 formed of suitable material, for example, grey polyurethane.

In order to provide for thermal insulation and sound absorbency within the casing 48, a layer of acoustical and thermal insulation 52 is secured to the interior surfaces of the casing and to the inside surface of the lower portion of the face plate 46 below the inlet louvre openings 38. As an example of a suitable material for the insulation layer 52, it is noted that a layer of fine glass fiber board applied by cement works to advantage. As shown in FIGURE 2, this insulation 52 is also affixed to the inner surface of both end plates 53 and 54 of the casing.

The air aspirator 56 is positioned within the casing 48 and includes a nozzle portion 25 together with the curving high velocity air flow guide surface 26 extending from the nozzle and contoured and arranged similar to the construction illustrated in FIGURE 14. The nozzle portion 25 of the aspirator has certain advantages as will be described further below and operates to receive the incoming supply of high velocity air 58 in a short neck 59, which is here shown as protruding slightly through a suitable opening 60 in the bottom plate 62 of the casing 48.

In most installations it is found to be more convenient to position the casing 48 as illustratively shown, with the neck 59 of the nozzle at the bottom. Accordingly, for convenience of reference, the plate 62 is called the bottom plate of the casing, and the other parts are described in terms of the illustrative orientation as "end," "lower" or "upper," etc. However, there are numerous instances where the building structure and layout will require that the neck 59 of the nozzle be oriented at the top of the casing or at the left or right. It is an advantage of this air aspirating register that it can be positioned in any desired orientation and will operate in a highly satisfactory manner regardless of its orientation. The vertical position as illustrated is the usual operating position, but as indicated above, the operation of the apparatus is not limited to any particular position.

The neck 59 of the nozzle is adapted to be coupled to a suitable pipe or small diameter duct 64 surrounded by an insulation covering 65 and adapted to carry the high velocity supply air 58. In most installations it is found desirable to utilize an insulated flexible pipe or duct 64, for example, such as is disclosed in U.S. Patent No. 2,936,792. In this preferred example of an air aspirating register, the neck 59 is shown as having an outside diameter of 2.0 inches for connection to a duct 64 having a corresponding I.D. For purposes of securing the insulated duct 64 to the casing, a collar 66 tightly embraces the end of the duct insulation 65 and has a flange 68 affixed to the casing bottom plate 62. The opening 60 is sufficiently large to allow the insulation 65 to protrude into the casing 48 to provide an air-tight fit with the neck 59.

In order to distribute the incoming high velocity supply air 58 quietly and uniformly to all points along the narrow orifice 22, the interior surfaces 70 of the walls 72 of the nozzle portion 25 are smoothly rounded in all directions and polished, as seen in FIGURES 2 and 3, and sharp edges or breaks are eliminated. As indicated in FIGURE 2, these interior surfaces 70 include contiguous reverse curves which are substantially tangential with the throat of the orifice 22. Toward is opposite ends the interior surfaces 70 define oval passages extending out to the end of the orifice 22 as seen in cross section in FIGURE 3, for this shape has been found to provide ample flow of high velocity supply air fully out to the end of the orifice, while enabling construction of a compact over-all nozzle.

To provide the desired flow capacity for the high velocity supply air and at the same time to provide the required exit velocity for maintaining the high aspirating ratio of at least 1 to 1 discussed above under widely varying conditions of operation as encountered in actual usage, the orifice 22 preferably has a length of at least six inches and no more than eighteen inches when used with a supply duct 65 with an I.D. of between 1.5 and 2.75 inches. In a preferred embodiment constructed in accordance with the present invention as shown for use with a duct 64 having an I.D. of 2.0 inches, the orifice 22 is 11.0 inches long. It will be understood that the length of the orifice 22 and the configuration of the throat of the orifice may be varied somewhat, although the particular dimensions and construction described have been found to be very satisfactory in testing under widely varying conditions of operation in many different types of buildings.

A pair of arcuate smoothing vanes 74 are positioned within the nozzle 74 to prevent any tendency for the flow of the high velocity supply air to concentrate out toward the ends of the orifice. These arcuate vanes or baffles 74 serve to capture and direct the required proportion of the high velocity flow toward the center region of the orifice 22, and thus, the vanes 74 assure a uniform over-all distribution of the ejected layer 20 issuing at all points along the orifice. The downstream ends 75 of these vanes 74 are spaced with respect to the length of the orifice 22 so as to divide up the interior space of the nozzle near the orifice 22 into three substantially equal parts. In the preferred example as shown with an orifice 11.0 inches long, the downstream ends 75 are spaced 4.0 inches apart and are each 3.5 inches from the respective ends of the orifice. The interior surfaces 70 of the nozzle are smooth with sharp projections being avoided.

For making a nozzle 25 having the desired shape and smooth interior configuration as described above, a preferred construction for the nozzle as shown is to fabicate it from two substantially identical die cast halves 25A and 25B having an air-tight joint 77 therebetween formed by mating flanges 78. These halves are internally polished and are secured together by suitable fastening means 79, for example by machine screws.

To position the initial convex area 27 of the air flow guide surface 26 closely adjacent to the high velocity layer 20 being ejected from the orifice while minimizing the over-all size of the aspirator, the upstream edge 80 of this guide surface overlaps the interior surface of the lip 29 and is secured by suitable fastening means directly to the interior surface of the lip 29 of the nozzle at a position spaced upstream away from the throat of the orifice. In this preferred embodiment, three very small metal metal tapping screws 81 are used. These screws 81 are positioned a substantial distance upstream from the throat or narrowest part of the orifice so that their heads do not disturb the air flow out through the orifice. If desired to place these screws nearer to the throat of the orifice, their heads may be countersunk. Also, if desired to locate the edge 80 nearer the throat, a small longitudinal recess or rabbet in the lip 29 may be provided, as shown at 82 in the modified register 39A of FIGURE 12, into which the edge 80 fits with its exposed surface flush with the inner surface of the lip 29. However, the construction as shown is found to operate quite satisfactorily in actual practice.

In order to facilitate the convenient mounting of the nozzle 25 within the casing 48, the opposite ends or wings 83 of the nozzle include mounting lugs 84 adapted to engage in a pair of spring mounting clips 85 secured to the opposite end plates 53 and 54 of the casing. As seen best in FIGURE 4, each mounting clip 85 has a generally L-shape including a long resilient inclined leg or ramp 86 spot welded to the end plate 54 near the front of the casing, and a lateral leg 87 spaces the inner end of the inclined leg away from the end plate.

For convenient installation of the nozzle 25 within the casing 48, the neck 59 is first inserted down through the opening 60, and then the mounting lug 84 at each end is slid inwardly, as shown by the arrow in FIGURE 4, along the spring ramp 86. The ramp 86 is deflected outwardly as indicated in broken outline until the lug 84 becomes aligned with a hole 88 in the ramp, at which instant the ramp 86 snaps into position around the lug 84 so as to lock the nozzle 25 in position. The neck 59 is held in the desired position within the opening 60 by a notched clip 89 which engages the abutting flanges 78 on the halves of the nozzle at the joint 77. Thus, the position of the nozzle within the casing is accurately determined, and the nozzle is held firmly in place by three points of support, namely, at the two mounting lugs 84 and at the clip 89.

In the illustrative preferred embodiment of an air aspirating register for installation in the wall, the air flow guide surface 26 is formed of sheet material, shown as sheet metal, and it extends to a limit 41 near the outlet zone defined by the openings 42. This limit 41 is shown as being formed by a bend in the sheet metal with a sloping baffle portion 90 extending up to be secured to the top plate 91 of the housing 48 near the front. When the high velocity film 30 and the moving room air 40 meet the inclined baffle 90, a thorough turbulent mixing occurs as they move toward the outlet 42, thus assuring uniform temperature in the output air mixture 92.

As shown in FIGURE 3, the outlet louvre openings 42 are sloped upwardly and outwardly substantially parallel with the inclined baffle 90. When the aspirating register 39 is used in position with the nozzle at the top, as illustrated schematically in FIGURE 3A, then it is sometimes found desirable to have the louvre outlet openings 42A slope in the direction as the inlet openings 38. Thus, the outlet openings 42A are generally perpendicular to the baffle 90 and serve to deflect the output mixture 92 upwardly and outwardly.

When utilized in a cooling system, it is preferable to apply a baffle face moisture absorbent liner 93 to the sloping baffle 90. This catches any condensed moisture which may appear during the initial cooling or "pull down" period of operation. Thereafter, the moisture is re-evaporated in the output air flow 92. A suitable material for the absorbent liner 93 is a layer of grey polyurethane sponge at least one-quarter of an inch thick.

A thermostatic control assembly 94 accurately and sensitively responds to the temperature of the room air 34 and controls the effective width of the orifice 22. This thermostatic assembly includes a manually adjustable knob 95 for setting the desired temperature within the room as indicated by a room temperature setting scale 96, which is displayed on a raised rectangular panel 97 surrounding the axis of the assembly 94 and held by a pair of mounting screws 98 secured to the face plate 46. The knob is open to admit a substantial induced flow 100 of room air through the thermostatic assembly 94 for sensing room air temperature. A triangular web 102 within the air passage through the knob defines an easy-to-read pointer which is read in conjunction with the scale 96.

In order to control the flow, a shutter element 104 is slidably mounted upon a sloping outer surface or seat 105 which is inclined to the central plane of the nozzle as defined by the joint 77 so that movement of the shutter element effectively changes the width of the orifice. This sloping seat 105 is formed by the inclined outer face of the lip 28 in conjunction with a plurality of spaced inclined shoulder fins 106 which are integral with the nozzle wall 72 and are contiguous with the inclined outer face of the lip 28. At the opposite ends of the nozzle 25 are a pair of spaced flanges 108 forming parallel guides engaging the ends of the shutter element. These flanges 108 have bearing openings therein for rotatably supporting the opposite ends of a shutter bar 110.

During changes in the operating position of the thermostat, the shutter bar 110 is rotated by movement of a flexible wire cable 112, as seen best in FIGURES 6 and 7. A pair of shutter cranks 114 slide the shutter element 104 upon its seat 105. These cranks 114 are rigidly secured to the rotatable bar 110 by suitable fastening means shown as set screws 117 (FIGURE 6). At the end of each crank 114 is an articulated coupling for operatively connecting the crank to the shutter element 104. In this example, the articulated coupling means comprise a rounded element or pin 116 engaging in a slotted socket member 118 on the shutter element. A bowed leaf spring 119 lies between the pin 116 and the back of the shutter element for pressing the shutter element firmly down against its sloping seat 105.

The shutter element 104 comprises a rigid backer plate 120, shown as a rigid metal strip. The socket 118 is formed by a pair of closely spaced tabs, as seen in FIGURE 14, which are struck out from the backer plate 120 and are bent up perpendicular to it. The leaf spring 119 is slotted surrounds both of the tabs of the socket so that it cannot slip out of place beneath the crank pin 116. A soft flexible acoustically absorbent liner 121 is beneath the backer plate 120 and bears down against the seat 105. To provide a low coefficient of friction, this felt liner is preferably formed of a slippery fiber, for example, a felt of Teflon polytetrafluoroethylene fiber is found to be advantageous. The soft flexible edge of the liner 121 extends beyond the edge of the backer plate, and when the shutter is closed, it is this flexible edge of the liner which abuts against the convex air flow guide surface 27, thus assuring a complete closure and quiet shut-off of the air flow.

In this illustrative embodiment of the invention, the temperature sensing element 122 is a "Vernatherm" element which is obtained commercially from Detroit Controls Corporation. Changes in the temperature of the room air 100 passing through the thermostatic control assembly cause an expansion or contraction of a pliable material 123 within the element 122. The result is that an increase in temperature causes a piston 124 to move to the left out of its cylindrical 126. This movement of the piston 124 slackens the cable 112, and a torsion spring 128 (FIGURE 2) rotates the shutter rod so as to slide the shutter to further reduce the orifice. Conversely, a decrease in room air temperature correspondingly further opens the orifice.

The cable is fastened to a piston head 130 attached to the end of the piston rod 124. A tension spring 132 is connected between the barrel of the cylinder 126 and the piston head 130 for purposes of retracting the piston rod against the pliable material within the cylinder 126 when the temperature of the sensing element 122 is reduced.

The sensing element 122 is fixedly screwed into an adjustable support 134 having a pair of oppositely twisted cam follower blades 136 and 137 projecting therefrom in sliding engagement with annular cam surfaces 138 and 139, respectively, of a hollow cylindrical cam member 140 (FIGURES 9 and 10). The knob 95 is fastened to the cam element 140 by a set screw 141.

Manual rotation of the knob 95 causes a corresponding rotation of the cam element 140, and the cam action of the two cam surfaces 138 and 139 against the follower blades 136 and 137 serves to move the support 134 toward or away from the shutter bar 111 to produce the desired temperature setting at which the register 39 will automatically maintain the room. The cam element 140 is rotatably supported by means of a ring mount 142 secured to a pair of parallel struts 144 which have semi-circular recesses engaging a pair of Teflon bushings 146 loosely fitting on the shutter rod 110.

In order to prevent rotation of the adjustable support 134 while permitting its adjustment toward and away from the shutter bar 110, the struts 144 have channels 147 therein engaged by projecting bent tabs or keys 148 on the adjustable support 134. A locking ring 150 holds the cam element in place on its ring mount 142. A pair of stop lugs 151 (FIGURE 9) on the interior of the cylindrical cam element 140 bump against the tabs 148 upon rotation of the knob 95 to its extreme positions so as to limit the rotation of the knob over an arcuate range of travel of slightly less than 180° corresponding with the arc of the temperature scale 96 and with the cams 138 and 139.

In the modified air aspirating register 41A of FIGURE 12, the position of the shutter element 104 is adjusted by a manually operable lever 152 projecting through a slot 154 in the register face plate 46. This lever is directly connected to the shutter bar 110. It will be understood that parts of this modified air aspirating register of FIGURE 12 performing functions corresponding with those of other figures have corresponding reference numbers.

In FIGURES 2, 3 and 12 is shown a stop 156 adjustable in position and held by a screw 158. This stop has an elongated slot surrounding the screw and the stop nests between two parallel ridges 159 on the nozzle body. Vertical adjustment of this stop serves to limit the full open movement of the shutter element at a position less than the full width of the orifice in the nozzle 25 as may be desirable for smaller rooms. Also, for registers 41 or 41A which are located near to the source of supply air, it may be desired to limit the full open position of the shutter for reducing the maximum possible flow of the supply air. A scale 160 is provided on the nozzle adjacent to the lower end of an adjustable stop 156 to help in selecting the desired position for this stop.

The efficient operation of these aspirating registers as described herein provides a low decibel mixing of the extreme temperature high velocity air with the ambient air. Moreover, any sound which may be generated by the aspirating register is radiated from the orifice 22 and is in the upper portion of the audio frequency sound in quite directional in its radiation pattern. As shown in FIGURE 3, 3a, and 12, the orifice 22 is advantageously positioned in offset relationship with respect to the inlet and outlet openings 38 and 42 in the grille face. The inlet and outlet openings 38 and 42 are closely adjacent and located generally in the upper half of the casing 48 whereas the nozzle 25 and orifice 22 are located generally in the lower half of the casing. Thus, there is a solid portion of the grille face which extends across in front of the orifice 22 which blocks any high frequency sound from direct radiation into the room. In addition, this solid portion of the grille face supports an area of the sound absorbent material 52 which absorbs a large proportion of any sound from the orifice 22.

It is found that increasing the vertical height of the register further increases the aspirating ratio. Thus, for special installations where an even larger aspirating ratio is desired, a larger register with a more extensive guide surface 26 and more extensive inlet and outlet openings 38 and 42 may be used. For most installations the illustrative registers are found to work very satisfactorily in providing the described advantages. It is to be noted that the present invention enables the construction of a compact highly effective register. The illustrative examples are one foot square in face area and less than four inches deep and produce desirably moderate, substantially uniform output air over a very wide range of operating conditions with input air at high velocity and extreme temperature and automatically regulates itself in a very effective manner from full closed to full open position. Moreover, any partial closure of the shutter produces an increase in aspirating ratio.

The illustrative embodiments of the invention are readily adapted for use in cooling systems. For example, the flexible cable 112, shown in FIGURE 6, is wound in the opposite direction around the rotatable rod 110 so that with reference to FIGURE 7 the cable is arranged in the modified cooling register to extend tangentially from the top of the rod 112. Also, the centerline of the thermostatic control assembly 94 is raised to be aligned with the cable where the cable extends from the top of the rod 110. A convenient way to raise the centerline of the thermostatic control assembly 94 is to turn it upside down. It will be noted that the recesses in the ends of the struts 144 which engage the bushings 146 on the rod 110 are offset from the centerline of the assembly 94. Thus, the assembly is adapted to be utilized for cooling control by turning it upside down with a reverse wound cable as discussed, and appropriate changes are made in the scale 96 as will be understood.

From the foregoing it will be understood that the air aspirating methods and apparatus of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances some of the features of the invention may be used without a corresponding use of other features, all without departing from the scope of the invention.

What is claimed is:

1. Air aspirating apparatus for maintaining a building at a comfortable living temperature by supplying to an outlet air at an extreme temperature mixed with a greater amount of air induced to flow along therewith, comprising a casing having an inlet for said induced air flow, a nozzle adapted to be connected to a source supplying air at high velocity and extreme temperature and having a long and narrow orifice for ejecting a narrow layer of the high velocity supply air outwardly from said nozzle in an initial direction, a continuously curved convex air flow guide surface extending from one side of said orifice tangent to the layer of high velocity air being ejected from said orifice, said convex guide surface commencing immediately adjacent to said orifice and extending away from said orifice and providing a continuously curving face diverging backwardly away from said initial direction at an increasing angle at progressively greater distances from said orifice for continuously holding said high velocity layer of air closely adjacent to said curving guide surface forming a high velocity film of air of extreme temperature clinging to said curving guide surface and travelling rapidly therealong, said curving convex guide surface continuing to a position near to said outlet and remote from said orifice, said orifice and curving guide surface being located in said casing in cooperative relation to said inlet for exposing said high velocity clinging film of air to the induced air entering said inlet, and said inlet being directly in front of said convex guide surface and being of extensive area in proportion to the area of said convex guide surface, thereby propelling a greater amount of induced air along beside said high velocity film toward said outlet.

2. Air aspirating apparatus for maintaining a building at a comfortable living temperature by supplying an outlet with air of extreme temperature mixed with a greater amount of air drawn from the building, comprising a casing having an inlet for the air drawn from the building and an outlet for supplying the air mixture to the building, a nozzle adapted to be fed with supply air of high velocity and extreme temperature, said nozzle having a long and narrow orifice for ejecting the supply of air as a fast moving layer, said orifice extending parallel to the front of said casing near to said inlet, and an effectively curved convex guide surface extending behind both said inlet and outlet, said convex guide surface extending outwardly away from said nozzle from a position adjacent to said orifice, said inlet and outlet being in the front of said casing and immediately adjacent one to another and defining a major proportion of the frontal area of said casing directly in front of said convex guide surface, said guide surface having an area initially tangent to the direction of ejection of the supply air from said orifice and continuously curving backwardly as it continues from a position near said inlet to a position near said outlet and said initially tangent area near said orifice being of greater curvature than the area of said guide surface more remote from said orifice.

3. Air aspirating register apparatus for maintaining a building at a comfortable living temperature by supplying an outlet with air of extreme temperature mixed with a greater amount of air drawn from the building, comprising a casing having a front face including an inlet for the air drawn from the building and an outlet for supplying the air mixture to the building, a nozzle adapted to be fed with supply air of high velocity and extreme temperature, said nozzle having a long and narrow orifice for ejecting the supply air as a fast moving layer, a continuously curved convex guide surface having an initial region of greater curvature adjacent to and defining the back side of said orifice, said initial region being tangent to the direction of ejection of said supply air and said convex guide surface extending away from said orifice for a substantial distance while continuously curving in a convex direction with respect to the front face of said casing, said fast moving layer of supply air clinging to said guide surface as said supply air rapidly moves away from said orifice and forming a fast moving film travelling along adjacent to said curved guide surface, said inlet and outlet forming a major proportion of the total area of the front face of said casing directly in front of said curved convex guide surface for exposing a large mass of the building air to said fast moving film for propelling the building air to a position near said outlet, and an inclined baffle near said outlet positioned at an abrupt change in direction with respect to said curved convex guide surface defining the outward limit of said guide surface and being inclined toward said outlet for turbulently deflecting the supply air from said film toward said outlet for mixing with the air drawn from the building.

4. Air aspirating register apparatus as claimed in claim 3 and wherein said inclined baffle has a liner of porous moisture absorbent material thereon for collecting condensed moisture during initial periods of operation of said register apparatus and for retaining said moisture for subsequent re-evaporation after said initial period has passed.

5. Thermostatically controlled aspirating register apparatus for maintaining a building at a comfortable living temperature by supplying air to an outlet at extreme temperature mixed with a greater amount of air drawn from the building, comprising a casing having an inlet for the air drawn from the building and an outlet for supplying the air mixture to the building, a nozzle adapted to be fed with supply air of high velocity and extreme temperature, said nozzle having a long and narrow orifice for ejecting the supply air in an initial direction as a fast moving layer, a fixed curved concex guide surface defining one side of said narrow orifice and initially extending outwardly away from said orifice in the same direction as the initial direction of the ejected air and progressively curving backwardly providing a convex surface for retaining said fast moving layer against said guide surface as a film travelling therealong, said guide surface extending from a position near said inlet to a position near said outlet, a shutter element movably mounted in said nozzle, said shutter element being positioned on the opposite side of said orifice from said convex guide surface and being inclined at a large angle to the initial direction of the ejected air, said shutter element having one edge thereof normally spaced a small distance from said convex guide surface for movement toward and away from said convex guide surface for progressively restricting the width of said orifice, and thermostatic means in said inlet connected to said shutter element for moving said edge of the shutter element toward and away from said convex guide surface.

6. Controllable aspirating apparatus for maintaining a room at a comfortable living temperature by supplying air of extreme temperature mixed with a greater amount of air drawn from the room, comprising a nozzle adapted to be fed with supply air of high velocity and extreme temperature, said nozzle having a long and narrow orifice of a width less than ¼ of an inch for ejecting the supply air as a fast moving layer, a continuously curved convex guide surface extending outwardly away from said nozzle from an initial area adjacent to one side of said orifice, a sliding shutter element slidably mounted in said nozzle on the opposite side of said orifice from the initial area of said curved guide surface defining the orifice between an edge of said sliding shutter element and said convex guide surface, and control means for progressively sliding an edge of said shutter element toward said initial area of the guide surface for progressively decreasing the width of said orifice while maintaining an aspirating ratio greater than 1 to 1.

7. Adjustable aspirating apparatus for maintaining a building at a comfortable temperature by mixing air of extreme temperature with a greater amount of ambient air comprising a nozzle for receiving air supplied at high velocity and extreme temperature, said nozzle being symmetrical about a central plane and having a narrow elongated orifice aligned with said central plane for ejecting a thin sheet of the supply air, a curved convex air flow guide surface extending away from said orifice and having an initial area closely adjacent to one side of said orifice, said initial area of the convex guide surface having a bulging contour adjacent to said thin sheet of supply air for stabilizing the ejected sheet of supply air and causing the sheet of supply air to cling to said convex guide surface and to travel therealong as a fast moving film, a shutter slidably mounted on the nozzle on the opposite side of said orifice from said curved convex guide surface, said shutter being inclined to said central plane with one edge of said shutter near to said bulging contour for defining at the outlet of said orifice the narrowest opening thereof between said edge and said bulging contour, and control means for sliding said shutter toward and away from said bulging contour for varying the spacing at the outlet of said orifice.

8. A thermostatically controlled aspirating register for maintaining a room at a comfortable temperature by feeding to an outlet a mixture of air at extreme temperature mixed with a greater amount of air drawn from the room for thermostatically controlling the amount of air at extreme temperature in response to the temperature of the air being drawn from the room comprising a casing having a grille face with a wide inlet for room air extending over the center of the grille face and a wide outlet for the mixed air extending over one end of the grille face, a nozzle near the other end of the casing adapted to be fed with supply air of high velocity and extreme temperature, said nozzle having a narrow elongated orifice for ejecting a sheet of supply air therefrom at high velocity, a curved convex guide surface extending from one side of said orifice past said inlet and toward said outlet for holding the sheet of supply air in clinging relationship with said convex guide surface, said grille face having a panel area extending directly in front the orifice for blocking the direct radiation of sound from the orifice into the room, a shutter member movably mounted for progressively restricting said orifice, and a thermostatic element for sensing the temperature of the room air mounted near the center of said panel area for controlling said shutter member, said panel area having an opening therein adjacent to said thermostatic element for admitting a flow of the room air thereto.

9. An aspirating register for maintaining a room at a comfortable temperature thermostatically controlled in response to the temperature of the air being drawn from the room comprising a casing having an inlet and an outlet, a nozzle adapted to be fed with supply air of high velocity and extreme temperature and having a long narrow orifice with a curved convex guide surface extending from one side of said orifice for providing a film of supply air flowing along said convex guide surface arranged to create an induced flow of room air into the register through said inlet, said register providing a mixture of the room air and supply air from said outlet, a thermostatic element adjacent said inlet for sensing the temperature of the room air in said induced flow, and a slidable shutter member slidably mounted in said register directly at the outlet of said orifice for moving an edge of said shutter element toward said convex guide surface and controlled by said thermostatic element for modulating the width of the outlet of said orifice, whereby the aspirating ratio is maintained when the orifice is restricted for assuring adequate induced flow of room air, thereby providing accurate response of the thermostatic element to the temperature of the room air throughout the full range of operation of the register.

10. Air aspirating apparatus for mixing supply air of extreme temperature and high velocity with room air to provide a mixture of moderate temperature for feeding to a room comprising a casing adapted to be mounted in the wall of a room and having a large opening in the front thereof facing toward the room, a nozzle mounted in one end of said casing and having a long and narrow orifice directed toward the interior of said casing into the region behind said large opening, a curving convex guide surface defining the rear side of said orifice and extending across said casing toward the opposite end thereof, said nozzle being adapted to discharge the supply air through said orifice for forming a high velocity film travelling along adjacent to said convex guide surface, said convex guide surface extending behind said large opening with its convex surface facing toward said large opening and said large opening extending directly in front of a major portion of said curving convex surface for inducing the flow of room air into said casing through said large opening by the velocity drag action of said high velocity film, and a deflector at the far end of said convex guide surface for deflecting said mixture into the room.

References Cited by the Examiner

UNITED STATES PATENTS

| | | | |
|---|---|---|---|
| 1,878,012 | 9/1932 | Stacey et al. | 165—123 |
| 2,345,537 | 3/1944 | Keep | 165—123 |
| 2,432,289 | 12/1947 | Dauphinee | 98—40 |
| 2,490,379 | 12/1949 | Schlumbohm | 62—281 |
| 2,523,497 | 9/1950 | Copping | 236—49 |
| 2,680,355 | 6/1954 | Colomb | 62—281 X |
| 2,821,897 | 2/1958 | Kreuttner | 98—38 X |

OTHER REFERENCES

Warren, R. W.: Wall effect and binary devices. In proceedings of the fluid amplification symposium, October 1962, vol. 1, pages 11–16 TP 156 F65 F5 1962 Sci. Library.

WILLIAM F. O'DEA, *Acting Primary Examiner.*

EDWARD J. MICHAEL, *Examiner.*